United States Patent
Waldbaum

(10) Patent No.: US 12,099,797 B2
(45) Date of Patent: Sep. 24, 2024

(54) TECHNIQUES FOR AUTOMATICALLY ADJUSTING FONT ATTRIBUTES FOR INLINE REPLIES IN EMAIL MESSAGES

(71) Applicant: Microsoft Technology Licensing, LLC, Redmond, WA (US)

(72) Inventor: Brett Alan Waldbaum, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/079,852

(22) Filed: Dec. 12, 2022

(65) Prior Publication Data

US 2024/0193346 A1    Jun. 13, 2024

(51) Int. Cl.
G06F 40/109        (2020.01)

(52) U.S. Cl.
CPC ............... G06F 40/109 (2020.01)

(58) Field of Classification Search
CPC .................................................. G06F 40/109
See application file for complete search history.

(56) References Cited

U.S. PATENT DOCUMENTS

| | | | |
|---|---|---|---|
| 8,086,960 B1 | 12/2011 | Gopalakrishna et al. | |
| 8,392,519 B2 | 3/2013 | Madnani | |
| 10,645,036 B2 * | 5/2020 | Zhong | H04L 51/216 |
| 2009/0217192 A1 * | 8/2009 | Dean | G06F 3/0483 |
| | | | 715/777 |
| 2011/0010665 A1 | 1/2011 | Deluca et al. | |
| 2014/0280626 A1 | 9/2014 | Girish et al. | |
| 2018/0157979 A1 * | 6/2018 | Dehaghani | G06N 5/04 |
| 2018/0337877 A1 * | 11/2018 | Lane | G06F 40/117 |
| 2019/0155871 A1 | 5/2019 | Lane et al. | |

OTHER PUBLICATIONS

"14 Best Microsoft Teams Tips and Tricks to Supercharge Productivity", Retrieved from: https://www.scrumgenius.com/blog/11-best-tips-microsoft-teams, Jan. 13, 2021, 17 Pages.

(Continued)

*Primary Examiner* — Kyle R Stork
(74) *Attorney, Agent, or Firm* — NovoTechIP International PLLC

(57) ABSTRACT

A data processing system implements analyzing textual content of a reply email message as the reply email message is being authored by a first user in a first application on a first client device. The reply email message is created in response to a previously received email message. The system also implements detecting that the textual content of the reply email includes an inline reply, the inline reply is being inserted within a textual content of the previously received email message; and responsive to detecting the inline reply, causing the first application to automatically configure one or more attributes of an appearance of a font associated with the inline reply to distinguish the inline reply from the textual content of the previously received email message, and display the inline reply with the appearance of the font of the inline reply determined based on the one or more attributes.

20 Claims, 17 Drawing Sheets

(56) References Cited

OTHER PUBLICATIONS

Poremsky, Diane, "The Blue Line and Inline Replies in HTML Messages", Retrieved From: https://www.slipstick.com/outlook/email/blue-line-html-messages/, Oct. 4, 2014, 4 Pages.

Zhang, Shirley, "How to Auto Use Different Font Colors for Replying and Forwarding Emails with Outlook VBA", Retrieved from: https://www.datanumen.com/blogs/how-to-auto-use-different-font-colors-for-replying-and-forwarding-emails-with-outlook-vba/, May 17, 2018, 8 Pages.

* cited by examiner

TECHNIQUES FOR AUTOMATICALLY ADJUSTING FONT ATTRIBUTES FOR INLINE REPLIES IN EMAIL MESSAGES

BACKGROUND

Users often reply to queries in email messages with inline replies. An inline reply is when the text of the reply is added to the text of the previously received email message. In some instances, multiple users may reply to an email thread and add their own inline replies. It can be difficult to distinguish the inline reply text from the text of the previously received email message and to know who added each inline reply.

SUMMARY

An example data processing system according to the disclosure may include a processor and a machine-readable medium storing executable instructions. The instructions when executed cause the processor to perform operations including analyzing textual content of a reply email message as the reply email message is being authored by a first user in a first application accessible by a first client device, the reply email message being created in response to a previously received email message: detecting that the textual content of the reply email message includes an inline reply to the previously received email message, the inline reply including content within a body of the previously received email message: and responsive to detecting the inline reply, causing the first application to perform operations of: automatically configuring one or more attributes of a font associated with the inline reply to distinguish the inline reply from a textual content of the previously received email message, and causing the first client device to display the inline reply with an appearance of the font of the inline reply determined based on the one or more attributes.

An example data processing system according to the disclosure may include a processor and a machine-readable medium storing executable instructions. The instructions when executed cause the processor to perform operations including receiving, at a communication platform, textual content of a reply email message from a first client device associated with a first user, the reply email having been created in response to a previously received email message: detecting that the textual content of the reply email message includes an inline reply to the previously received email message: responsive to detecting the inline reply, automatically configuring one or more attributes of an appearance of a font associated with the inline reply to distinguish the inline reply from other textual content of the reply email message: and sending the reply email message and embedded font information to a second client device of a second user second client device of a second user, the font information including an indication of the one or more attributes of the font associated with the inline reply to cause the second client device associated with the second user to display the inline reply with the one or more attributes of an appearance of the font associated with the inline reply.

An example method implemented in a data processing system for managing font attributes of inline replies in email messages includes analyzing textual content of a reply email message as the reply email message is being authored by a first user in a first application accessible by a first client device, the reply email message being created in response to a previously received email message: detecting that the textual content of the reply email message includes an inline reply to the previously received email message, the inline reply including content within a body of the previously received email message: and responsive to detecting the inline reply, causing the first application to perform operations of: automatically configuring one or more attributes of a font associated with the inline reply to distinguish the inline reply from a textual content of the previously received email message, and causing the first client device to display the inline reply with an appearance of the font of the inline reply determined based on the one or more attributes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Techniques for automatically adjusting font attributes for inline replies in email messages are provided herein. These techniques address the technical problems associated with improving the readability of email messages that include inline replies. Inline replies are textual content that are part of a reply to an email by the sender of the reply in which the text of the reply is added within the body of text of a previously received email message. The previously received email message may be an original message from a sender or may be a reply email that includes replies to one or more previous email messages. This approach is often used to respond to queries in a previously received email message. The inline reply is often inserted in the body of text of the previously received email message proximate to the query being addressed. However, this approach can lead to difficulties in identifying what text was added by the sender of the reply. This can be particularly problematic in situations where multiple recipients of the email have added inline replies to an email thread. Currently, users address this problem by manually adjusting attributes of the font used for the inline reply to distinguish the inline reply text from the text of the body of the previously received email message and/or from the inline replies of other users. However, the current approach is a tedious and error prone manual process, particularly when there are multiple inline replies in an email message. Hence, there is a need for improved systems and methods that provide a technical solution for improving the processing of inline replies.

The techniques herein automatically detect when the user is adding an inline reply to the body of a reply email message and change the font attributes. These attributes may include but are not limited to changing the font type used for the inline reply, the font color, the font size, adding a highlight to the font, adding underlining, italicizing the text, and setting the font of the reply to bold text. The user is also provided tools for customizing font attributes of the inline replies if the user is not satisfied with the font attributes automatically selected to distinguish the user's inline reply from the textual content of the previously received email message and/or from the inline replies of other users. In some implementations, the user may specify preferred font attributes for the inline replies that the user adds to emails, and these font attributes are automatically applied to inline replies added by the user. A technical benefit of this approach is that the user experience is improved by providing the user with a set of tools for automatically modifying the attributes of the font of the inline replies and for customizing those font attributes according to user preferences. These and other technical benefits of the techniques disclosed herein will be evident from the discussion of the example implementations that follow.

Figure 1:
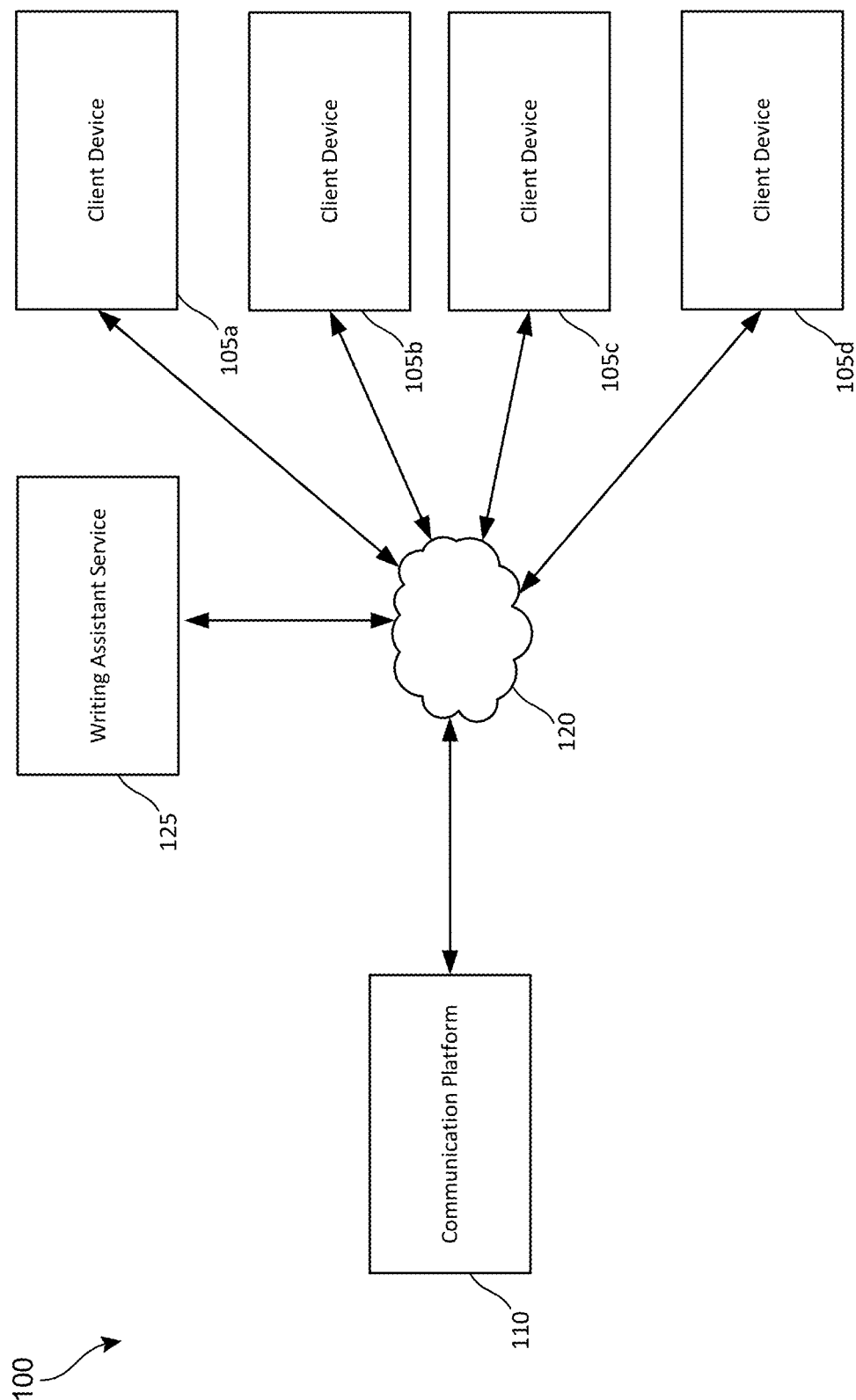
FIG. 1 is a diagram showing an example computing environment in which the techniques disclosed herein for managing the synchronization of files and file information among client devices and a file storage platform are implemented.

FIG. 1 is a diagram showing an example computing environment 100 in which the techniques disclosed herein for automatically adjusting font attributes for inline replies in email messages may be implemented. The computing environment 100 includes a communication platform 110. The example computing environment 100 also includes client devices 105a, 105b, 105c, and 105d (collectively referred to as client device 105) and writing assistant service 125. The client devices 105a, 105b, 105c, and 105d may communicate with the communication platform 110 and/or the writing assistant service 125 via the network 120. Furthermore, the writing assistant service 125 may communicate with the communication platform 110 via the network 120. The network 120 may be a combination of one or more public and/or private networks and may be implemented at least in part by the Internet.

In the example shown in FIG. 1, the communication platform 110 is implemented as a cloud-based service or set of services. The communication platform 110 is configured to facilitate communications among users of the communication platform 110. The communication platform 110 supports one or more of email, text messaging, chat messaging, and/or other types of messaging. In some implementations, the communication platform 110 also provides other services that are accessible to users via their respective client devices 105, such as but not limited to a collaboration platform which enables users to create and share electronic content. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to email message, text message, chat messages, word processing documents, presentations, websites (e.g., Microsoft SharePoint® sites), digital drawings, media files, components thereof, and the like.

The writing assistant service 125 provides cloud-based software and services that are accessible to users via the client devices 105a, 105b, 105c, and 105d. The writing assistant service 125 analyzes textual input and provides suggestions for improving the textual input. In some implementations, these suggestions include spelling, grammar, word usage, punctuation, capitalization, and/or other aspects of the textual input. The writing assistant service 125 may be used in conjunction with the services provided by the communication platform 110 to provide suggestions for improving the email message and other communications facilitated by the communication platform 110.

In some implementations, the writing assistant service 125 is configured to analyze emails, to detect that the user has added an inline reply to the email, and to provide an indication to the client device 105 of the user that the user has added an inline reply to the email. In some implementations, the writing assistant service 125 determines that an inline reply has been added to the modified email text by detecting that the textual content includes a key word or key phrase indicative of an inline reply being added to the textual content of the email message. In some implementations, the writing assistant service 125 determines that an inline reply has been added to the modified email text by detecting that additional textual content has been added within the textual content of the previously received email message as received by the user. In such implementations, the writing assistant service 125 receives a copy of the text of the body of the email sent to the user and compares the copy of the text of the body of the previously received email message with the copy of the text of the body of the email that has been modified by the user to determine that the user has added an inline reply. As discussed in the examples which follow, the client device 105 uses the indication received from the writing assistant service 125 to automatically change the font attributes of the inline reply and/or to provide the user with the ability to configure the attributes of the font applied to the inline reply.

The client devices 105a. 105b, 105c, and 105d are each a computing device that may be implemented as a portable electronic device, such as a mobile phone, a tablet computer, a laptop computer, a portable digital assistant device, a portable game console, and/or other such devices. The client devices 105a, 105b, and 105c may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices 105 that may utilize the writing assistant service 125 and/or the communication platform 110. Furthermore, in some implementations, the application functionality provided by the writing assistant service 125 may be implemented by a native application installed on the client devices 105a, 105b, 105c, and 105d, and the client devices 105a. 105b, 105c, and 105d may communicate directly with the communication platform 110 over a network connection.

Figure 2:
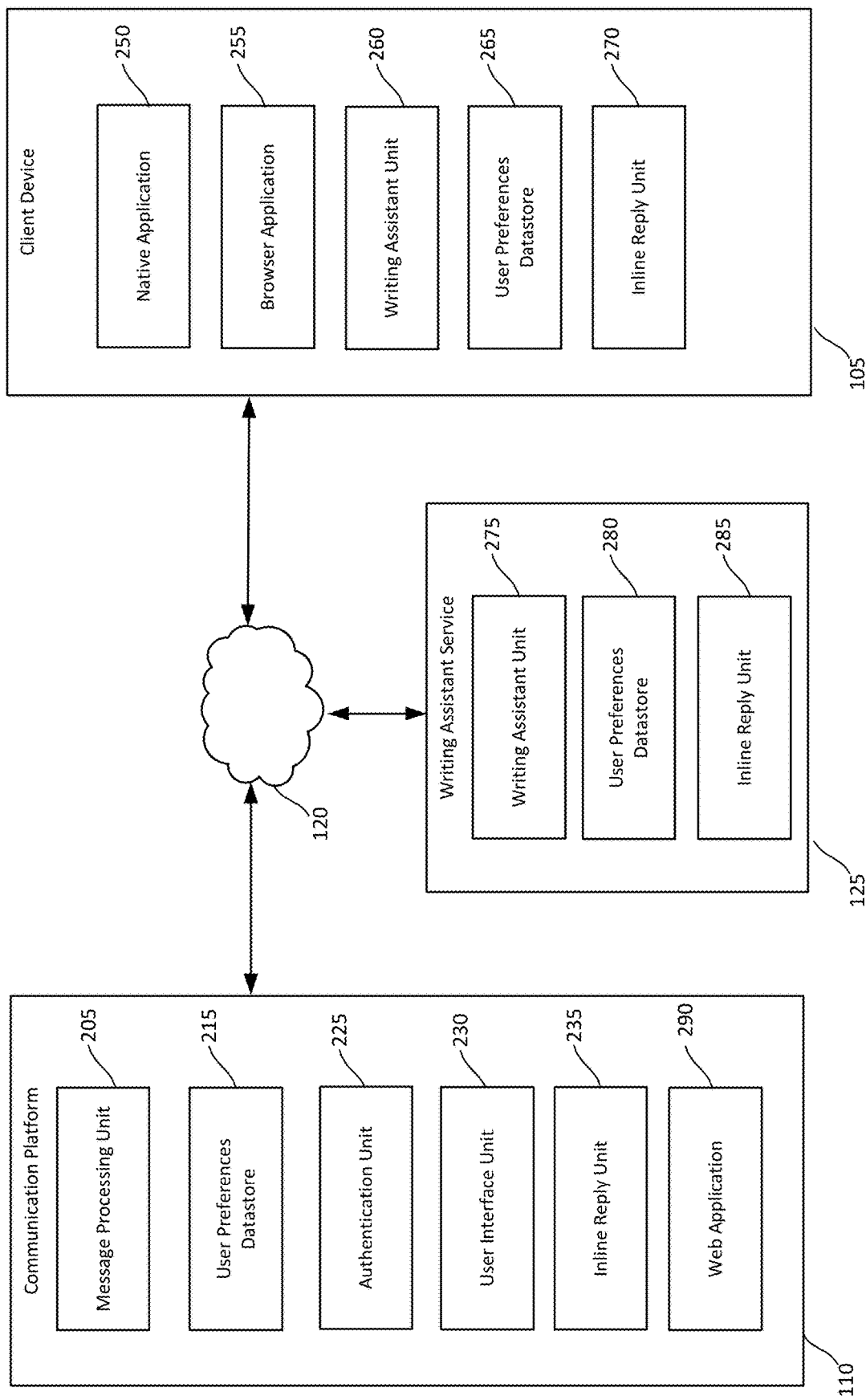
FIG. 2 is a diagram showing additional features of the communication platform, the client device, and the application service shown in FIG. 1.

FIG. 2 is a diagram showing additional features of the communication platform 110, the client device 105, and the writing assistant service 125. The communication platform 110 includes a message processing unit 205, a user preferences datastore 215, an authentication unit 225, and a web application 290. In some implementations, the communication platform 110 analyzes the text of an email message to determine whether an inline response has been added. In other implementations, the writing assistant service 125 analyzes the text of an email message to determine whether an inline response has been added to the email message. Furthermore, in some implementations, the client device 105 analyzes the text of an email message locally to determine whether an inline response has been added to the email message. Examples of the relationship between the writing assistance service 125, the communication platform 110, and the client device 105 will be described in greater detail below with respect to FIGS. 3A-3C.

The message processing unit 205 receives messages to be sent to users of the communication platform, such as the client devices 105a-105b or via the web application 290. The message processing unit 205 can support email messages, chat message, and/or other types of messages that are exchanged among users of the communication platform 110 and/or with external message senders or recipients who are not users of the communication platform 110. The message processing unit 205 stores copies of the various types of messages on the communication platform 110 and/or sends copies of the message to the client device 105 or client devices of the intended recipients of the messages in some implementations. In some implementations, the communication platform 110 both stores a copy of the message on the communication platform 110 and sends a copy of the message to the client device 105 of the intended recipients to provide a backup copy of the messages on the server should the copies of the messages sent to and/or stored on the client device 105 be inadvertently lost.

The user preference datastore 215 is a persistent datastore used to store user preference data. In some implementations, the user preference data includes indications whether the user prefers to maintain a copy of messages on the communication platform 110 or to delete such messages once the message has been delivered to the client device or devices 105 of the user. In some implementations, the user preference data includes information identifying the preferred font attributes to be applied to inline replies. The user preference datastore 215 may also include other user related information that can be used to provide the various services of the communication platform 110 to the user.

The authentication unit 225 provides functionality for verifying whether users are permitted to access the services provided by the communication platform 110. In some implementations, the authentication unit 225 provides functionality for receiving authentication credentials for the users from their respective client device 105. The authentication unit 225 may be configured to verify that the authentication credentials are valid and permit the users to access the services provided by the communication platform 110 responsive to the authentication credentials being valid.

The web application 290 can be accessed by the browser application 255 or browser-enabled instance of the native application 250 of the client devices 105a-105d. The web application 290 provides a user interface for accessing and composing messages. The web application 290 provides a user interface that enables the user to configure the user preferences stored in the user preference datastore 215. The web application 290 may also utilize the inline reply unit 235 to detect inline replies in email messages being drafted by a user and provide the various controls shown in the examples which follow for configuring the fonts.

The inline reply unit 235 is configured to analyze emails, to detect that the user has added an inline reply to the email, and to provide an indication to the client device 105 of the user that the user has added the inline reply to the email. In some implementations, the inline reply unit 235 determines that an inline reply has been added to the modified email text by detecting that the textual content includes a key word or key phrase indicative of an inline reply being added to the textual content of the email message. In some implementations, the inline reply unit 235 determines that an inline reply has been added to the modified email text by detecting that additional textual content has been added within the textual content of the previously received email message as received by the user. The text of the previously received email message is included in the reply email. In such implementations, the inline reply unit 235 accesses a copy of the text in the body of the previously received email message sent to the user and compares the text of the previously received email message with the text of the body of the modified email to determine that the user has added an inline reply. The inline reply unit 235 is used by the web application 290 provided by the user interface unit 230 to detect inline replies for implementations in which the user accesses their email from the communication platform 110. In some implementations, the native application 250 of the client device 105 sends the text of an email message to the communication platform 110 for analysis, and the inline reply unit 235 analyzes the message to determine whether an inline reply has been added to the email message. The inline reply unit 235 sends an inline reply indication to the client device 105 indicating whether an inline reply was detected in the email message. As discussed in the examples which follow, the writing assistant service 125 and/or the client device 105 may implement versions of the inline reply unit in some implementations.

The writing assistant service 125 may include a writing assistant unit 275, a user preferences datastore 280, and an inline reply unit 285. The writing assistant unit 275 analyzes textual input and provides suggestions for improving the textual input. In some implementations, these suggestions include spelling, grammar, word usage, punctuation, capitalization, and/or other aspects of the textual input. The textual input can be provided by a native application 250 of the client device 105. The textual input may be an email, a text message, text of an electronic document, and/or other textual content that is being authored or edited by the user of the client device 105. In some implementations, the writing assistant service 125 is configured to use the inline reply unit 285 to detect inline replies in email messages provided by the client device 105 and to provide an indication to the client device 105 that the email messages include an inline reply. The client device 105 or the web application 290 can automatically change the font attributes of the inline reply in the email message responsive to receiving the indication from the writing assistant service 125. In some implementations, the indication includes preferred font attributes for the user drafting the email. The preferred font attributes are obtained from the user preferences datastore 280.

The user preferences datastore 280 is a persistent datastore used to store user preference data used by the writing assistance service 125. The user preferences data 280 is used to store the preferred font attributes to be applied to inline replies in implementations in which the writing assistance service 125 is detecting inline replies in email messages. The user preferences datastore 280) may also include other user related information that can be used to provide the various services of the writing assistant service 125, such as but not limited to the types of suggestions that users do and do not wish to receive from the writing assistant service 125.

The inline reply unit 285 operates similar to the inline reply unit 235 of the communication platform 110. The inline reply unit 285 is configured to analyze emails, to detect that the user has added an inline reply to the email, and to provide an indication to the client device 105 of the user that the user has added the inline reply to the email. The inline reply unit 285 detects the presence of the inline reply using techniques similar to the inline reply unit 235.

The client device 105 includes a native application 250 and/or a browser application 255 in some implementations. The native application 250 is configured to communicate with the writing assistant service 125 and/or the communication platform 110. The native application 250 sends textual content to the writing assistant service 125 via the writing assistant unit 260 for analysis by the writing assistant service 125. The writing assistant services provides suggestions for improving the textual content in some implementations. The suggestions provided by the writing assistant service 125 are received by the writing assistant unit 260, which in turn provides the suggestions to the native application 250. The textual content analyzed by the writing analysis service 125 includes email messages which the writing assistant service 125 analyzes to determine whether an inline reply has been added to the body of text the previously received email message. In some implementations, the native application 250 utilizes an inline reply unit 270 implemented on the client device 105 to analyze the text of email messages to determine whether an inline reply has been added to the body of text of the email message.

The browser application 255 is an application for accessing and viewing web-based content, which may be provided by web application 290 of the communication platform 110. The web application 290 enables the user to utilize the services of the communication platform 110 in a similar manner as the native application described above. In some implementations, the communication platform 110 may support both the native application 250 and the web application 290, and the users may choose which approach best suits their needs.

The writing assistant unit 260 provides an interface for communications between the native application 250 and the writing assistant service 125. The writing assistant unit 260 is configured to receive information from the native application 250 to be sent to the writing assistant service 125 for analysis and to receive information from the writing analysis service 125 to be provided to the native application 250. The writing assistant unit 260 is configured to reformat the information passing through the writing assistant unit 260 to a format appropriate for the native application 250 and the writing assistant service 125.

The user preferences datastore 265 is a persistent datastore used to store user preference data. In some implementations, the user preference data includes information identifying the preferred font attributes to be applied to inline replies.

The inline reply unit 270 is configured to operate similarly to the inline reply units 235 and 285. The inline reply unit 285 is configured to detect inline replies in email messages provided by the native application 250, and to provide an indication to the native application 250 that the email messages include an inline reply. The native application 250 automatically changes the font attributes of the inline reply in the email message responsive to receiving the indication from the writing assistant service 125. In some implementations, the indication includes preferred font attributes for the user drafting the email. The preferred font attributes are obtained from the user preferences datastore 265.

Figure 3A:
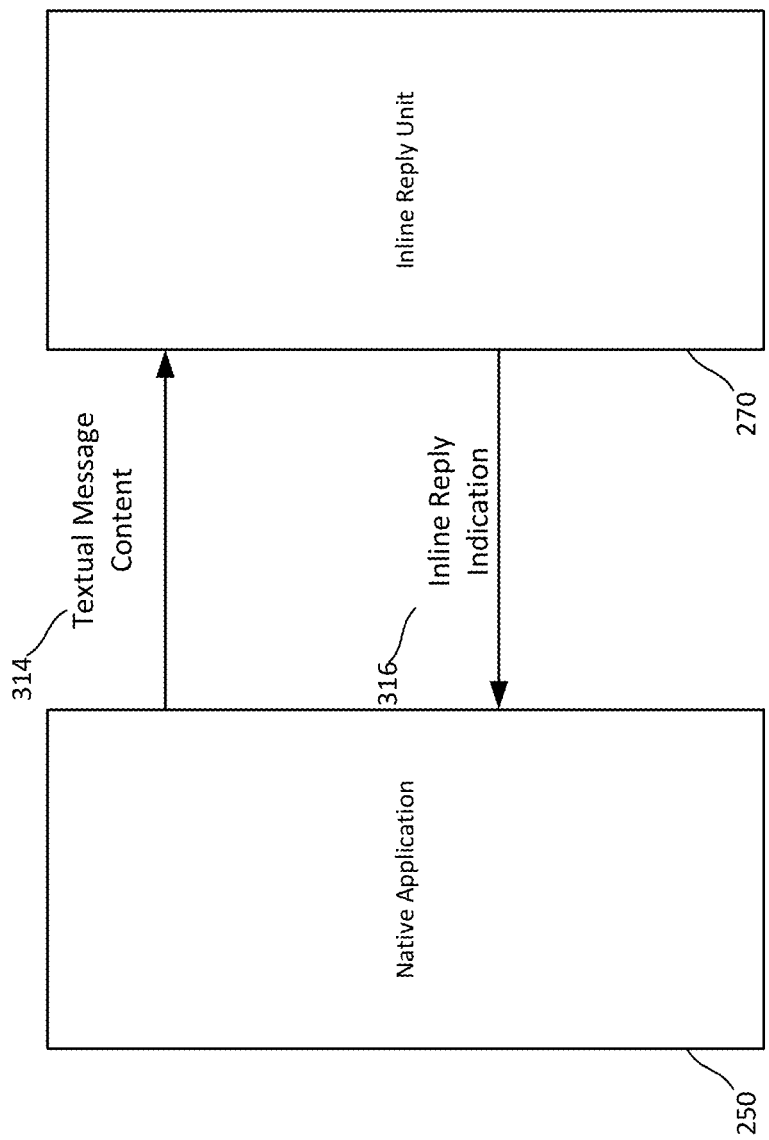
FIG. 3A shows an example of interactions between the native application and the inline reply unit of the client device.

FIG. 3A shows an example of interactions between the native application 250 and the inline reply unit 270 of the client device 105. In the example implementation of FIG. 3A, the client device 105 analyzes the textual content of the reply email message locally to determine whether the user has added an inline reply. The native application 250 sends the textual message content 314 to the inline reply unit 270. The inline reply unit 270 analyzes the textual content of the email message as discussed in the preceding examples and provides an inline reply indication 316 indicating whether the textual message content 314 included an inline reply.

The inline reply unit 270 analyzes the textual content of the reply email message as the replay email message is being authored by the user using the native application 250 on the client device 105. Consequently, the native application 250 repeatedly sends the textual message content 314 to the inline reply unit 270 as the user authors the reply message. In some implementations, the native application 250 sends the textual message content 314 to the inline replay unit 270 in response to each character or a predetermined number of characters being typed in the native application 250. In response to the inline replay unit 270) detecting the inline reply, the inline replay unit 270 sends the inline reply indication 316 which causes the native application 250 to automatically configure one or more attributes of a font associated with the inline reply to visually distinguish the inline reply from the textual content of the previously received email message and display the inline reply with the appearance of the font of the inline reply determined based on the one or more attributes. The inline reply indication 316 includes the information identifying the attributes a font associated with the inline reply to be applied by the native application 250.

Figure 3B:
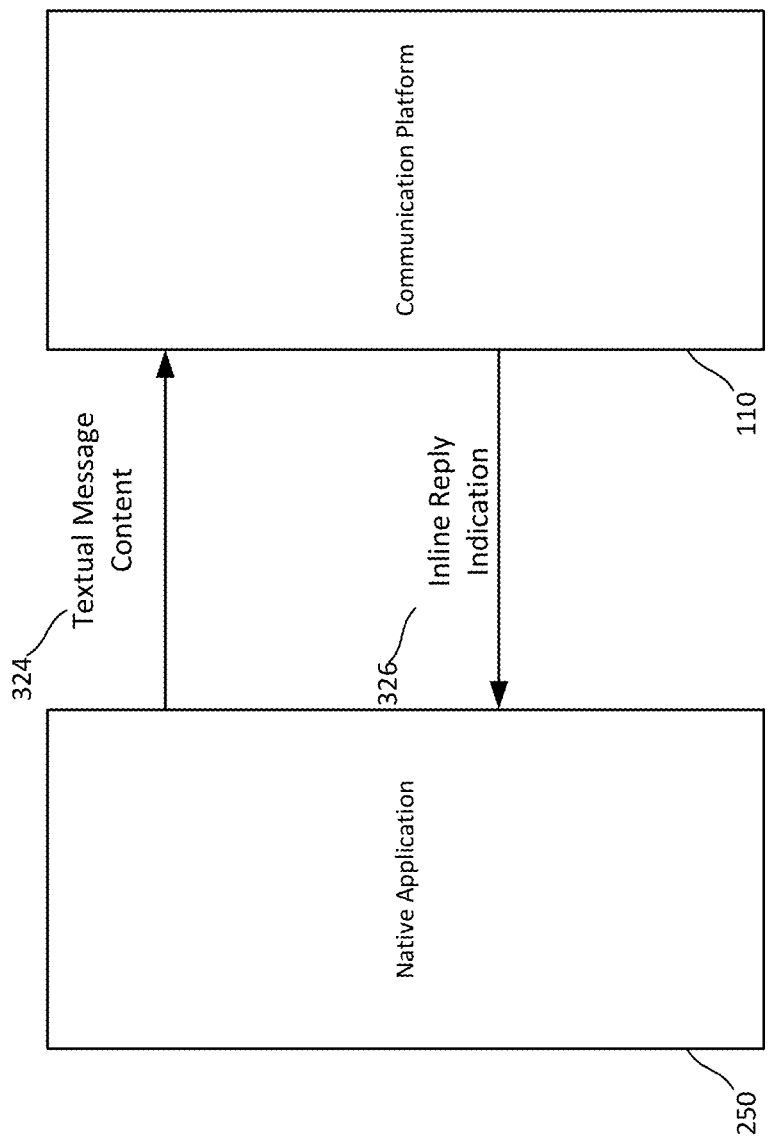
FIG. 3B shows an example of interactions between the native application of the client device and the communication platform.

FIG. 3B shows an example of interactions between the native application 250 of the client device 105 and the communication platform 110. In the example implementation of FIG. 3B, the client device 105 sends the textual content of the email message to the communication platform 110 for analysis to determine whether the user has added an inline reply to the email message. The native application 250 sends the textual message content 324 to the communication platform. The inline reply unit 235 analyzes the textual content of the email message as discussed in the preceding examples and provides an inline reply indication 326 indicating whether the textual message content 314 included an inline reply.

Figure 3C:
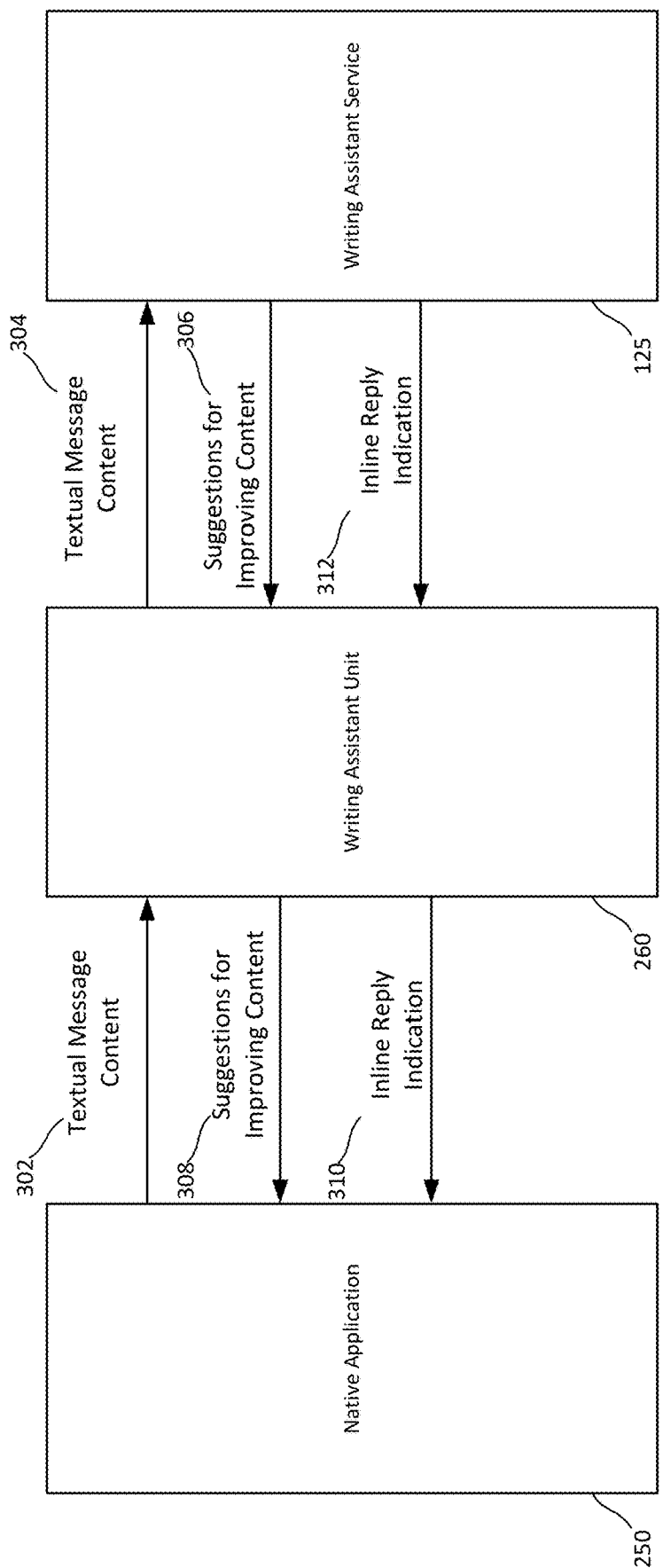
FIG. 3C shows an example of interactions between the native application and the writing assistant unit of the client device and the writing assistant service.

FIG. 3C shows an example of interactions between the native application 250 and the writing assistant unit 260 of the client device 105 and the writing assistant service 125. In the example implementation of FIG. 3C, the client device 105 sends the textual content of the email message to the writing assistant service 125 for analysis to determine whether the user has added an inline reply to the email message. The native application 250 sends the textual message content 302 to the writing assistant unit 260, and the writing assistant unit 260 sends the textual message content 304 to the writing assistant service 125 for analysis. The writing assistant service 125 analyzes the textual content of the email message as discussed in the preceding examples and provides suggestions for improving the content 306 and/or an inline reply indication 312 to the writing assistant unit 260. The writing assistant unit 260 sends the suggestions for improving the content 308 and/or the inline reply indication 310 to the native application 250.

Figure 3D:
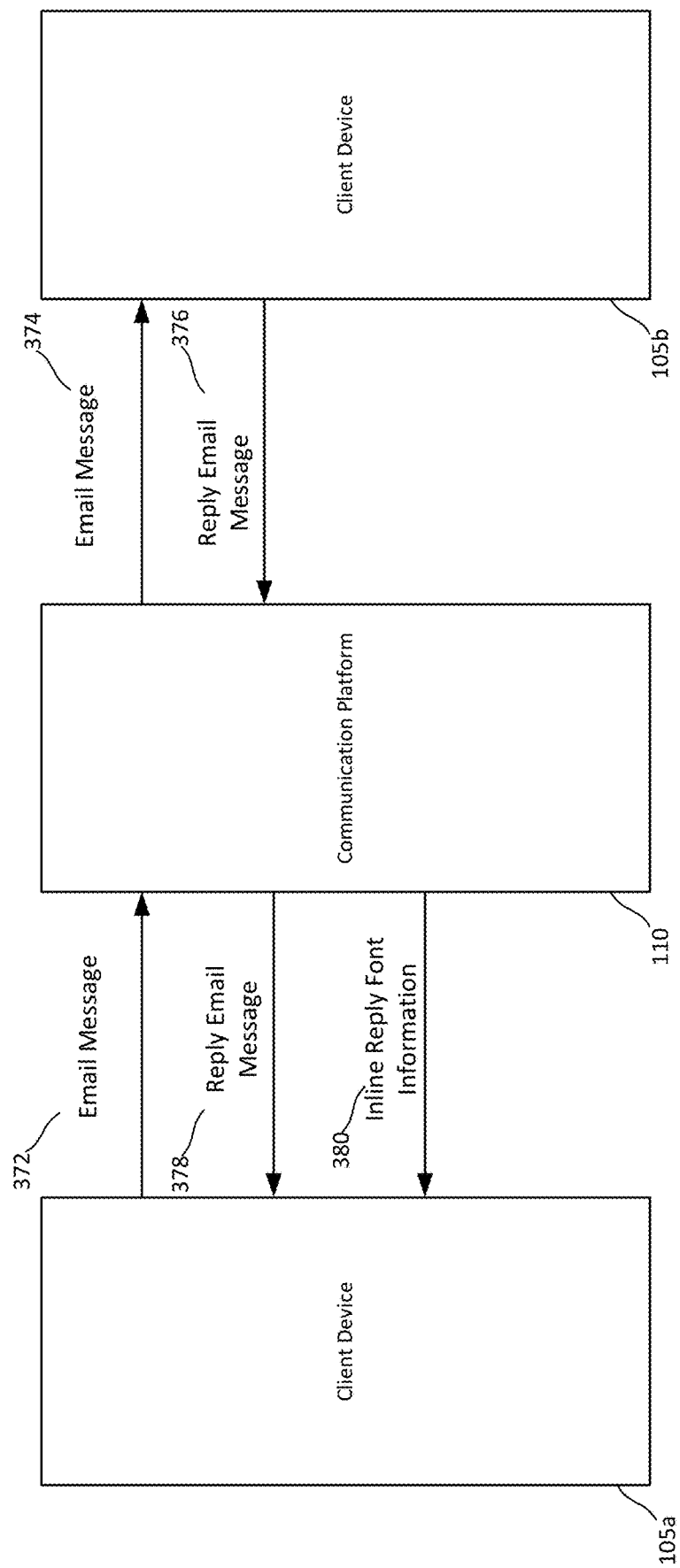
FIG. 3D shows an example of interactions between the client devices of two users and the communications platform.

FIG. 3D shows an example of interactions between the client devices of two users and the communications platform. In the example implementation shown in FIG. 3D, the communication platform 110 receives an email message 372 from a first user of a first client device 105a. The email message 372 is an original email drafted by the first user in some instances or a reply to a previous email in other instances. The email message 372 is intended for a second user associated with a second user device 105b. The communication platform 110 sends an instance of the email message 374 received from the first client device 105a to the second client device 105b. The second user drafts a reply email message in response to the email message from the first user, and the reply email message includes an inline reply. The second client device 105b sends the reply email message 376 of the reply email message to the communications platform 110. The communications platform 110 analyzes the reply message content 376 to detect that the textual content of the reply email message 376 includes an inline reply to the email message 374. The communication platform 110 automatically configures one or more attributes of a font associated with the inline reply to visually distinguish the inline reply from other textual content of the reply email message. The communication platform 110 determines that the first user is the intended recipient of the reply email message and sending the reply email message 378 and font information 380 to the client device 105a. The communication platform 110 also sends inline reply font information 380 to the client device 105a. The font information includes an indication of the font information including an indication of the one or more attributes the font associated with the inline reply to cause the second client device associated with the second user to display the inline reply with the one or more attributes of the font associated with the inline reply. In some implementations, the font information 380 is embedded in the body of the reply email message 378.

FIGS. 4A-4G are diagrams of an example user interface 405 showing various aspects of the functionality for automatically modifying the font characteristics for inline replies according to the techniques provided herein. The examples shown in FIGS. 4A-4G use the inline reply unit 270 of the client device 105 to analyze the text of an email message to detect inline replies. However, in other implementations, the communication platform 110 or the writing assistant service 125 may be used to analyze the textual content to detect inline replies. The user interface 405 may be presented by the native application 250 or by the web application 290 of the communication platform 110. In some implementations, the text of the reply email message is analyzed as the user in authoring the reply email message so that the detection of the inline reply is dynamic process. This allows the user interface 405 to quickly detect the inclusion of an inline reply and to automatically configuring one or more attributes of a font associated with the inline reply to visually distinguish the inline reply from the textual content of the previously received email message and/or present tools that allow the user to customize these attributes.

Figure 4A:
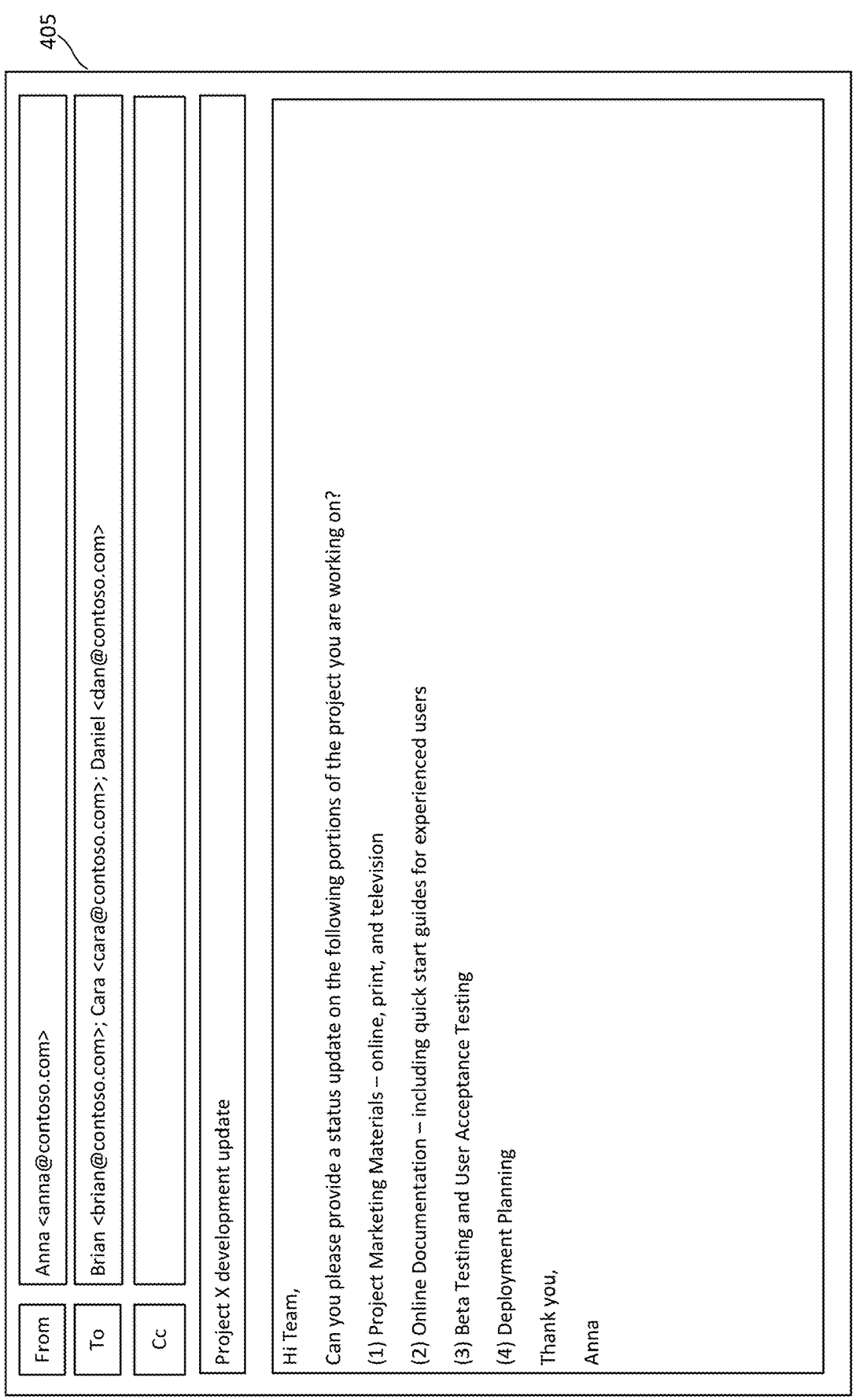
FIGS. 4A-4G are diagrams of an example user interface showing various aspects of the functionality for automatically modifying the font characteristics for inline replies.
Figure 4B:
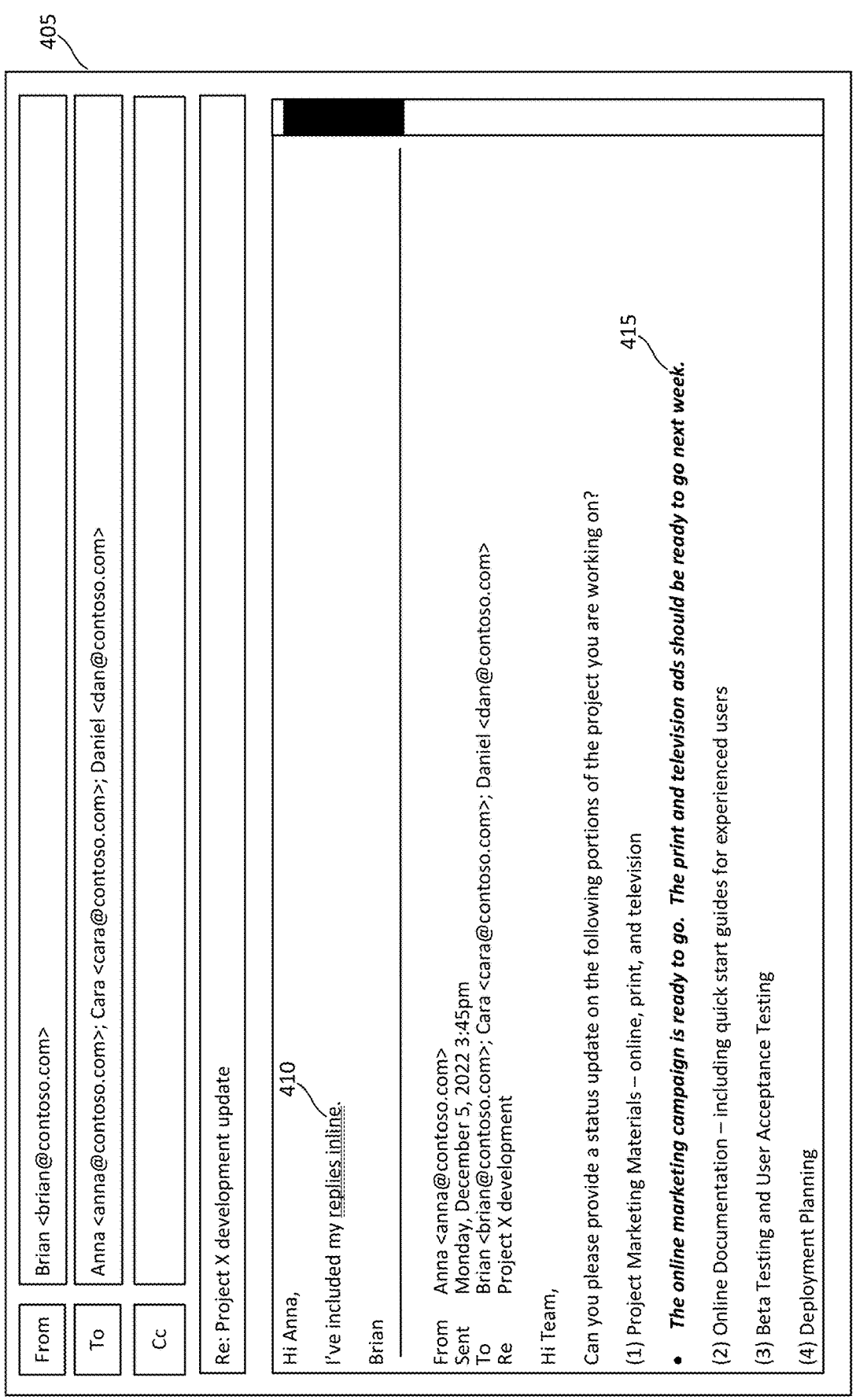

FIG. 4A shows an example of a user interface 405 of an email application in which a supervisor of a project team sends a request to her team for an update on the project. FIG. 4B shows an example of the user interface 405 on the client device 105 of a second user that is a recipient of the email shown in FIG. 4A. In the example shown in FIG. 4B, the user has typed the keyword "replies inline" in his response. The inline reply unit 270 of the client device 105 detects the presence of the key phrase 410 "replies inline" and adds emphasis to the keywords indicating that if the user clicks on or otherwise activates the keywords, the user interface 405 will present controls for modifying attributes of the font applied to the inline replies added by the user. In other implementations, the inline reply unit 270 recognizes keywords or key phrases in addition to or instead of the one shown in FIG. 4B. The detection of the keywords also triggers the inline reply unit 270 to change the font attributes of the inline reply 415. In some implementations, the inline reply unit 270 automatically selects the attributes of the font that the inline reply 415. In some implementations, the inline reply unit 270) selects the attributes of the font based on user preferences stored in the user preferences datastore 265. If the preferred font attributes have already been used by another user for the other user's inline replies or used by the author of the email when drafting the email, the inline reply unit 270 selects alternate font attributes to apply to the inline reply to distinguish the user's inline reply from those of the other user and/or the font originally selected by the author of the email to which the user is replying. In some implementations, the inline reply unit 270 automatically causes the font attribute configuration pane 420 shown in FIG. 4C to be displayed in instances in which the user's preferred font attributes have already been utilized by another user. This approach provides the user with the opportunity to configure the font attributes should the user be unsatisfied with the alternate font attributes that were selected by the inline reply unit 270.

Figure 4C:
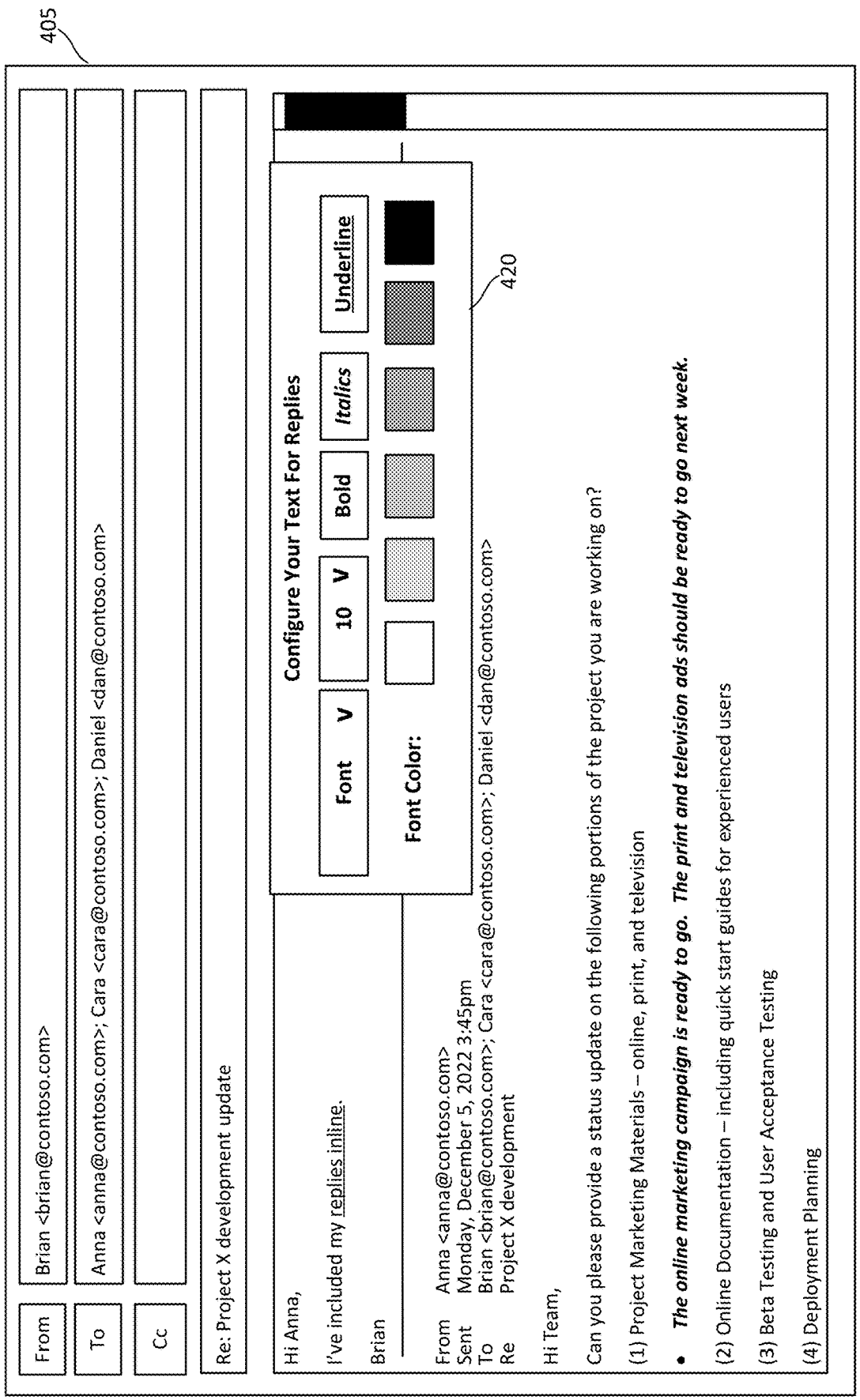

FIG. 4C shows an example of the user interface 405 from FIG. 4B in which a font attribute configuration pane 420 has been displayed. The inline reply unit 270 causes the font attribute configuration pane 420 to be displayed on the user interface 405. The inline reply unit 270 may cause the font attribute configuration pane 420 to be displayed automatically in response to detecting that the user has added an inline reply. In some implementations, the inline reply unit 270 is configured to display the font attribute configuration pane 420 in response to the user clicking on or otherwise activating the key phrase 410. The font attribute configuration pane 420 includes controls for configuring various attributes of the font used for the inline replies, such as font, font size, bold, underlined, and/or italicized text, and font color. Other implementations of the font attribute configuration pane 420 may include other controls for configuring attributes of the font used for the inline replies. In some implementations, the user selections may be stored as user preference in the user preferences datastore 265.

Figure 4D:
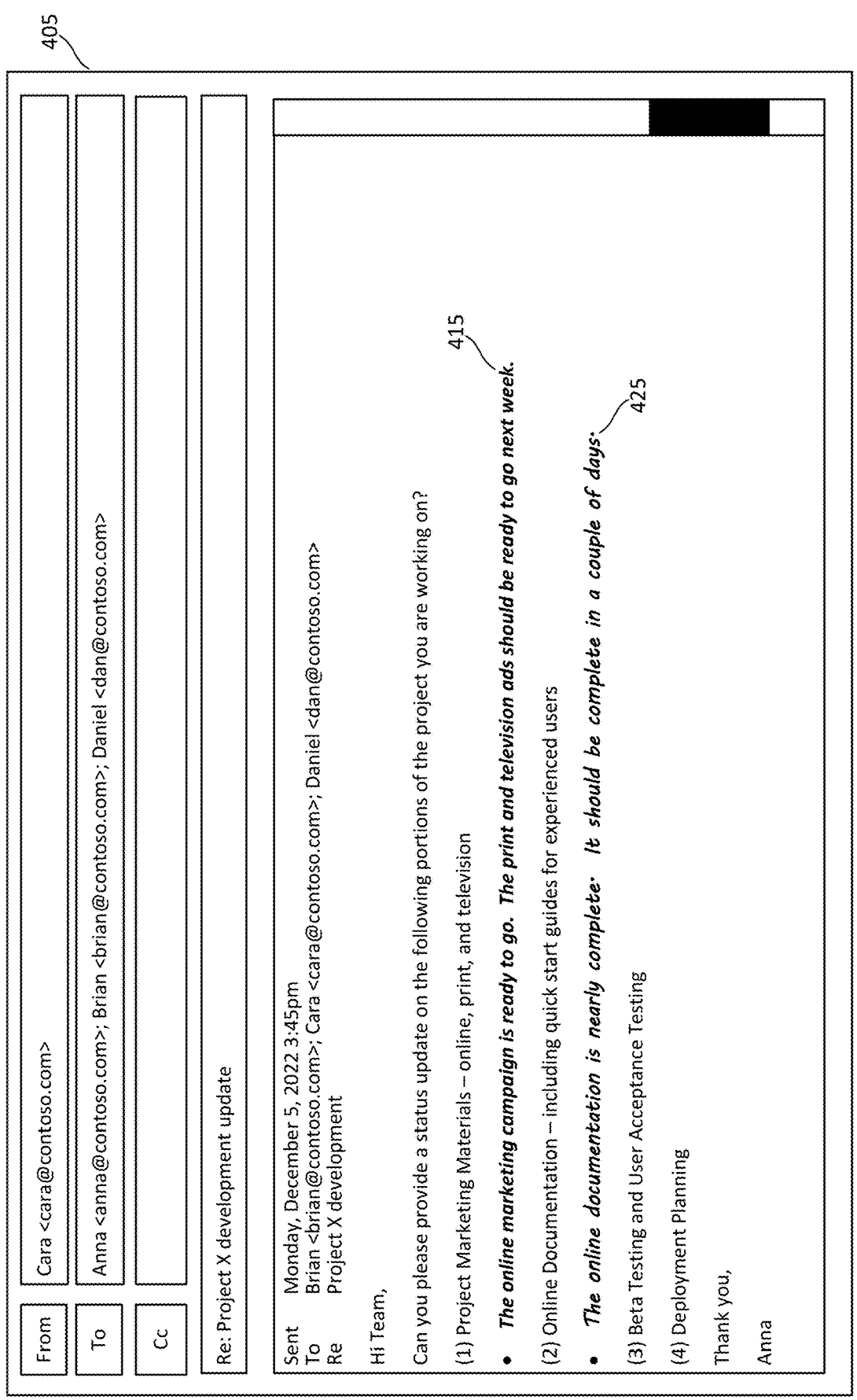

FIG. 4D shows an example of the user interface 405 in which a third user has added a second inline reply 425. The inline reply unit 270 has automatically set the attributes of the font of the second inline reply 425 to be different than that of the first inline reply 415.

Figure 4E:
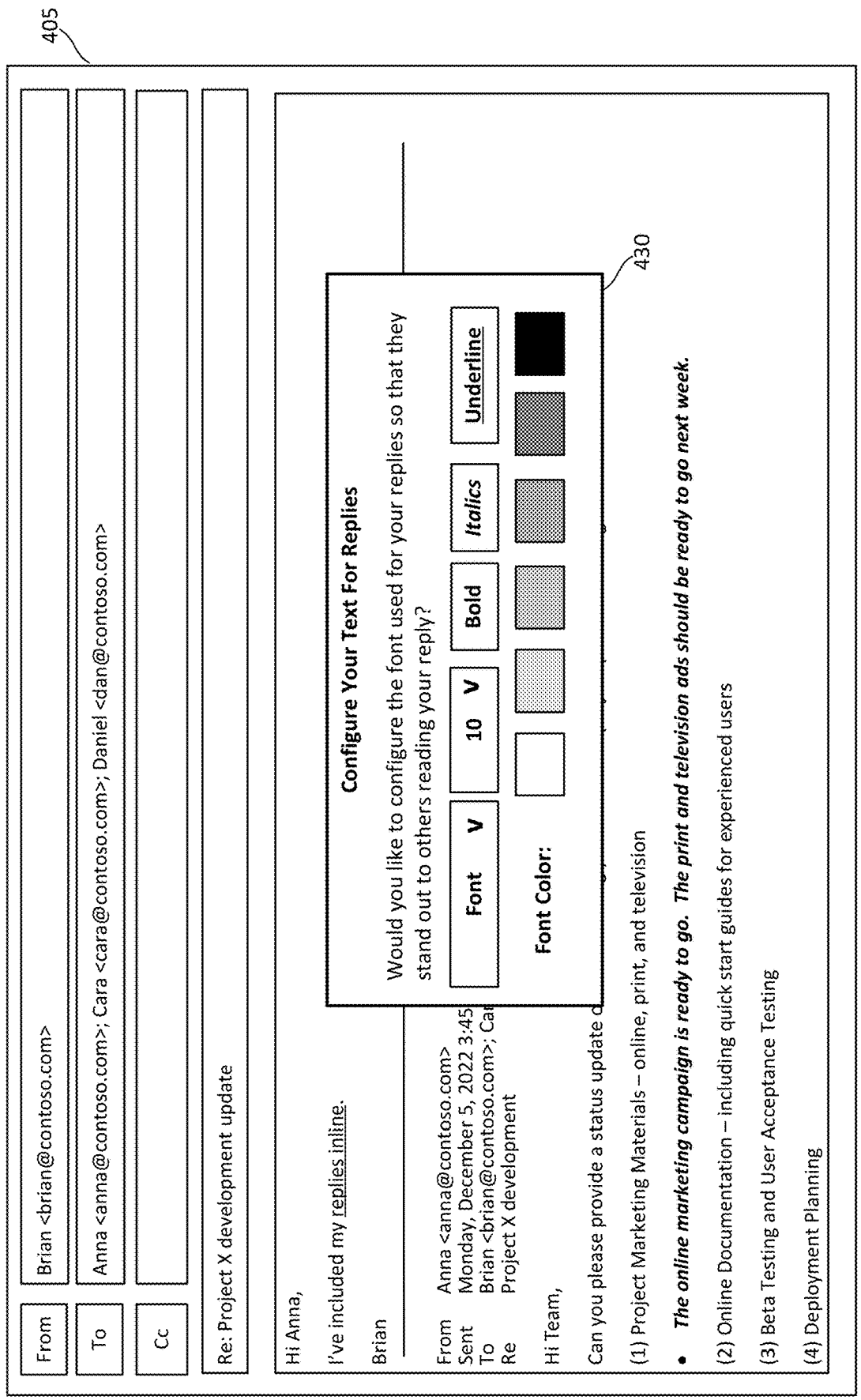

FIG. 4E shows an example of the user interface 405 in which an alternate implementation of the font attribute configuration pane 430 is shown. The font attribute configuration pane 430 may be presented to the user by the inline reply unit 270 in response to the inline reply unit 270 detecting that the user is typing an inline reply.

Figure 4F:
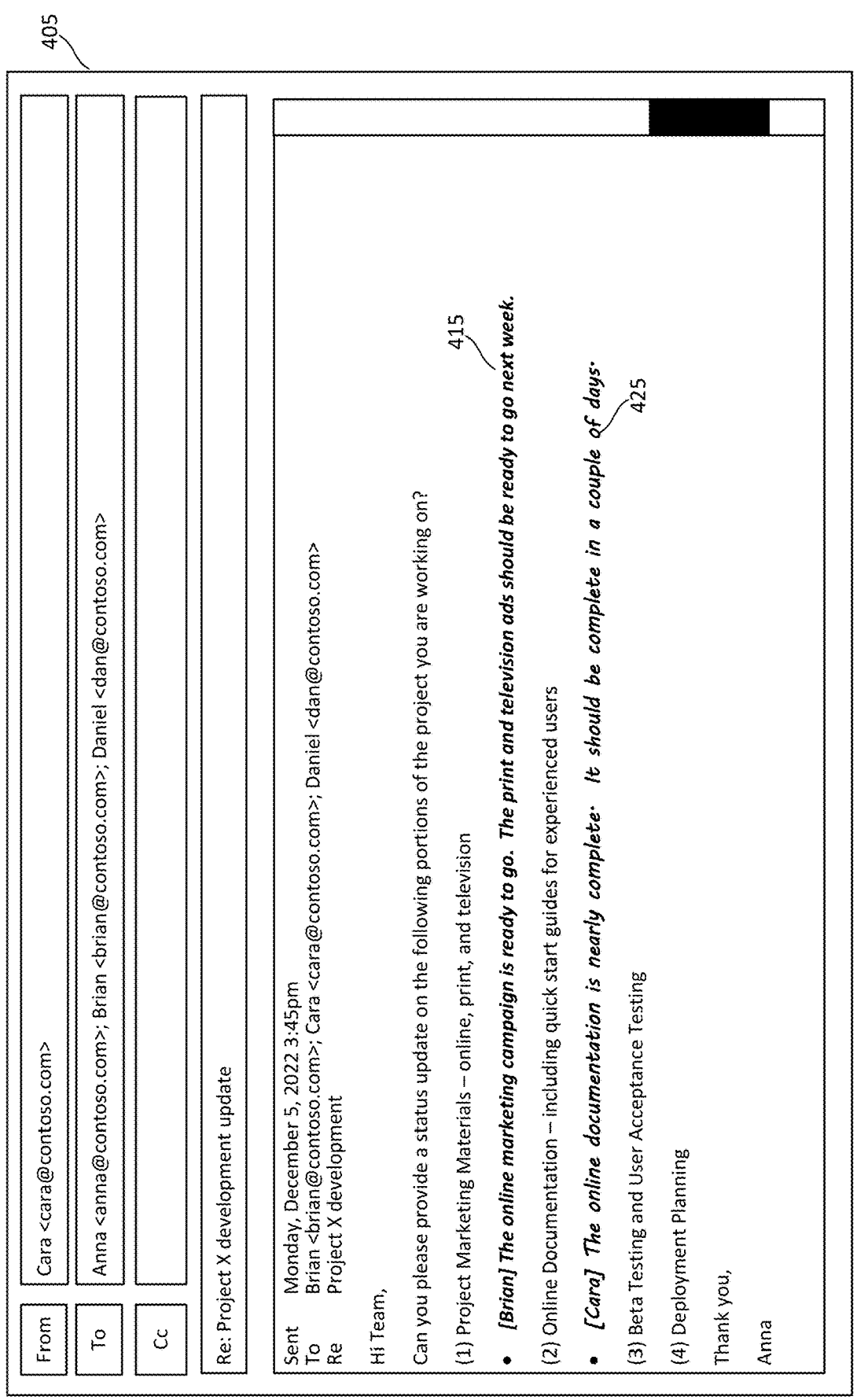
Figure 4G:
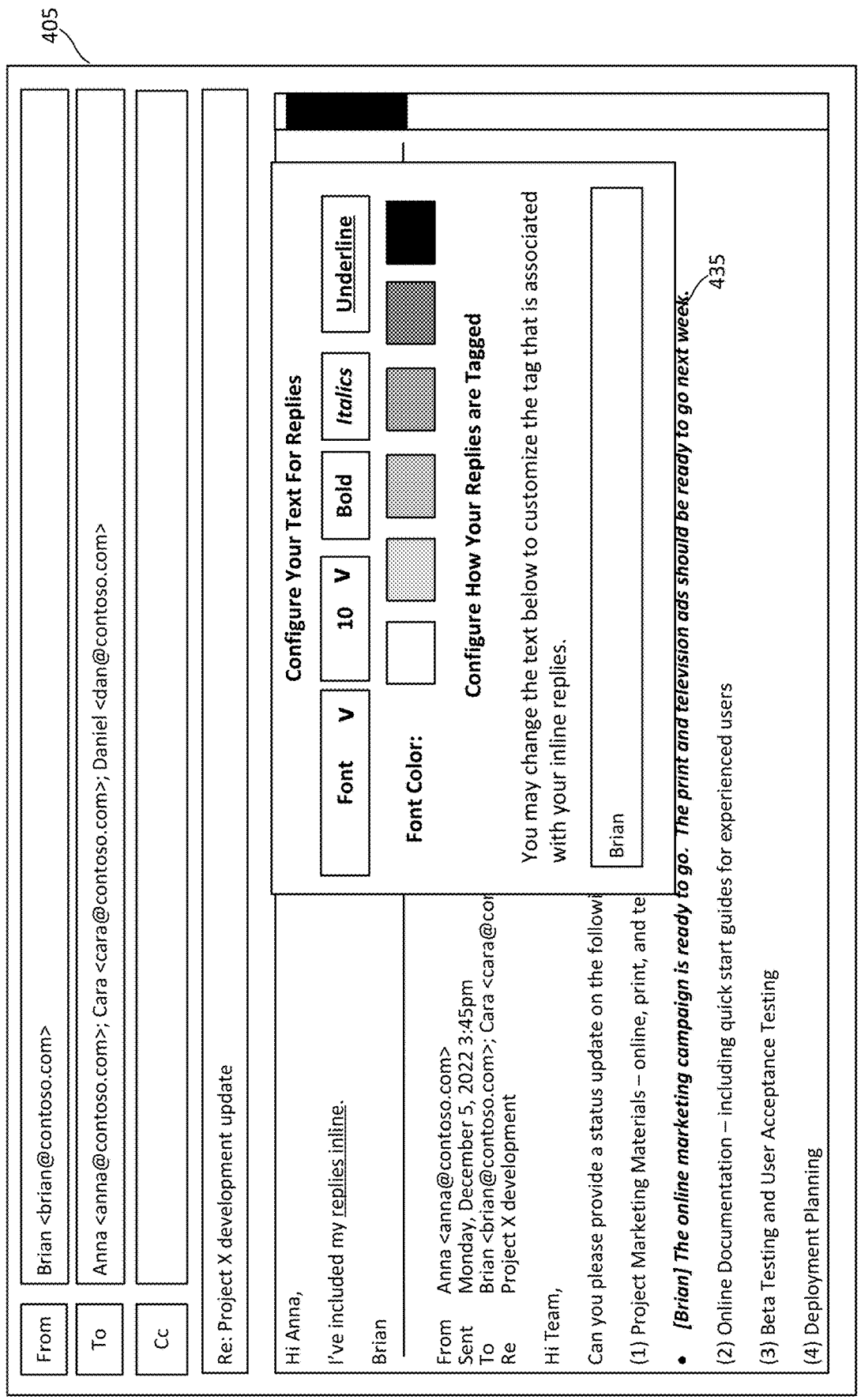

FIG. 4F shows an example of the user interface 405 in which tags have been added to the inline replies that identify the user that added each inline reply. The addition of the tags allows recipients of the email to quickly identify which user has added each of the inline replies in addition to the different font attributes applied for each user. In some implementations, the tag is the name, initials, email address or other information that may be used to identify which user added each of the inline replies. FIG. 4G shows an example of the user interface 405 in which the font attribute configuration pane 435 is configured to permit the user to configure the tag associated with the user's inline replies in addition to the controls for configuring the font attributes.

Figure 5:
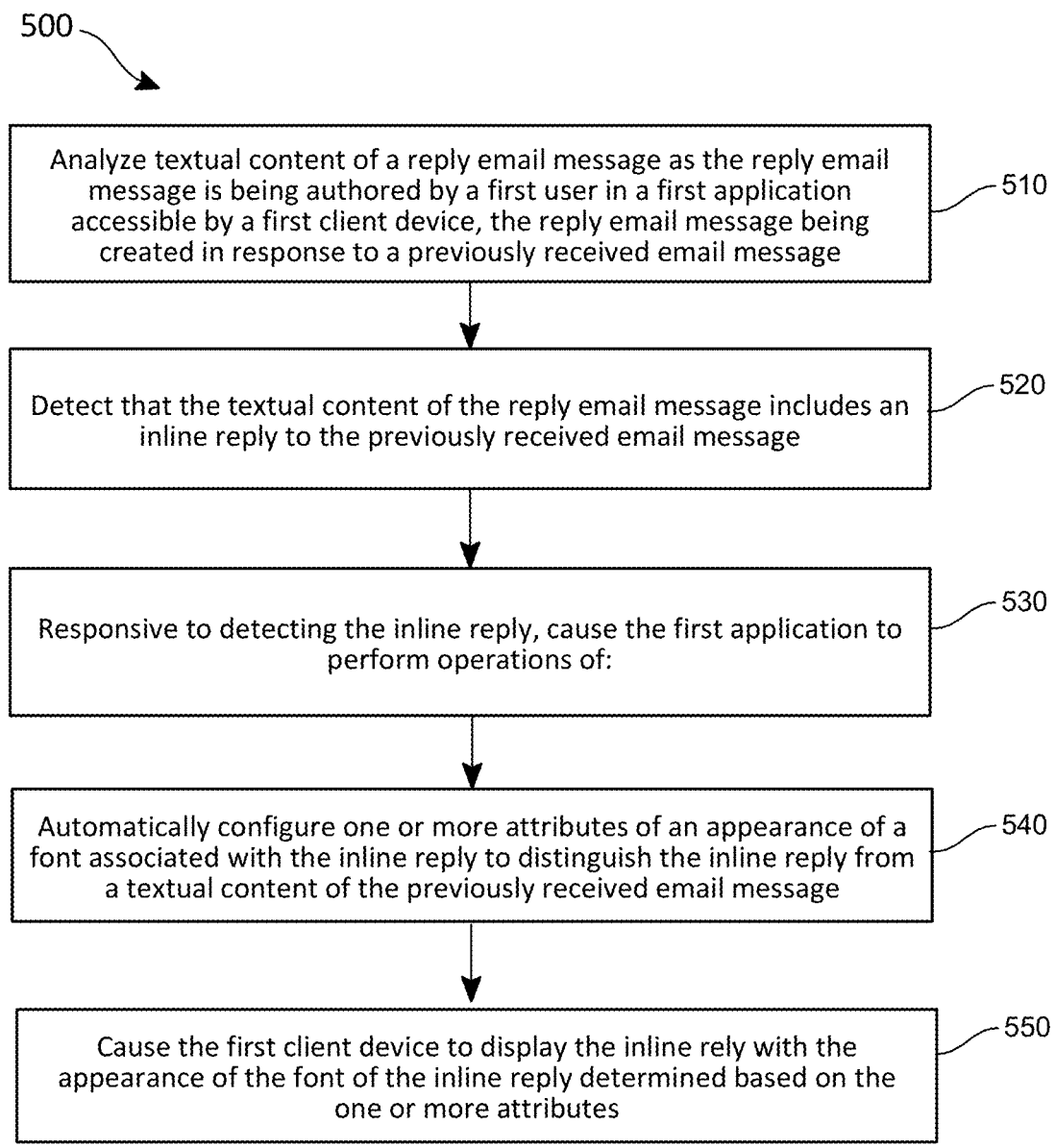
FIG. 5 is an example flow chart of an example process for managing font attributes of inline replies in email messages according to the techniques provided herein.

FIG. 5 is an example flow chart of an example process 500 for managing font attributes of inline replies in email messages. The process 500 is implemented by the client device 105 described in the preceding examples in some implementations. The writing assistant unit 260 and/or the inline reply unit 270 of the client device 105 implement the process 500 in some implementations.

The process 500 includes an operation 510 of analyzing textual content of a reply email message as the reply email message is being authored by a first user in a first application accessible by a first client device. The reply email message is being created in response to a previously received email message. The textual content of the reply email message is analyzed as the user is typing the reply email in some implementations to allow the client device 105 to dynamically detect the inline reply.

The process 500 includes an operation 520 of detecting that the textual content of the reply email message includes an inline reply to the previously received email message. The inline reply includes content within a body of the previously received email message. As discussed in the preceding examples, the first user may replay to a previously received email message that they received from another user, and the first user may include an inline reply in the text of the previously received email message. In some implementations, the inline reply unit 270 determines that an inline reply has been added by detecting that the textual content includes a key word or key phrase indicative of an inline reply being added to the textual content of the email message. In some implementations, the inline reply unit 270) determines that an inline reply has been added to the modified email text by detecting that additional textual content has been added within the previously received email message.

The process 500 includes an operation 530 of responsive to detecting the inline reply, causing the first application to perform operations 540 and 550. The operation 540 includes automatically configuring one or more attributes of a font associated with the inline reply to visually distinguish the inline reply from a textual content of the previously received email message, and the operation 550 includes causing the first client device to display the inline reply with the appearance of the font of the inline reply determined based on the one or more attributes. In some implementations, the inline reply unit 270) suggests font attributes that are different than the font used for the remainder to the email message to help recipients of the email message to distinguish the inline reply from the rest of the text of the email message, including other inline replies. In some implementations, the inline reply unit 270) accesses user preferences for the first user to determine and apply font attributes preferred by the user.

Figure 6:
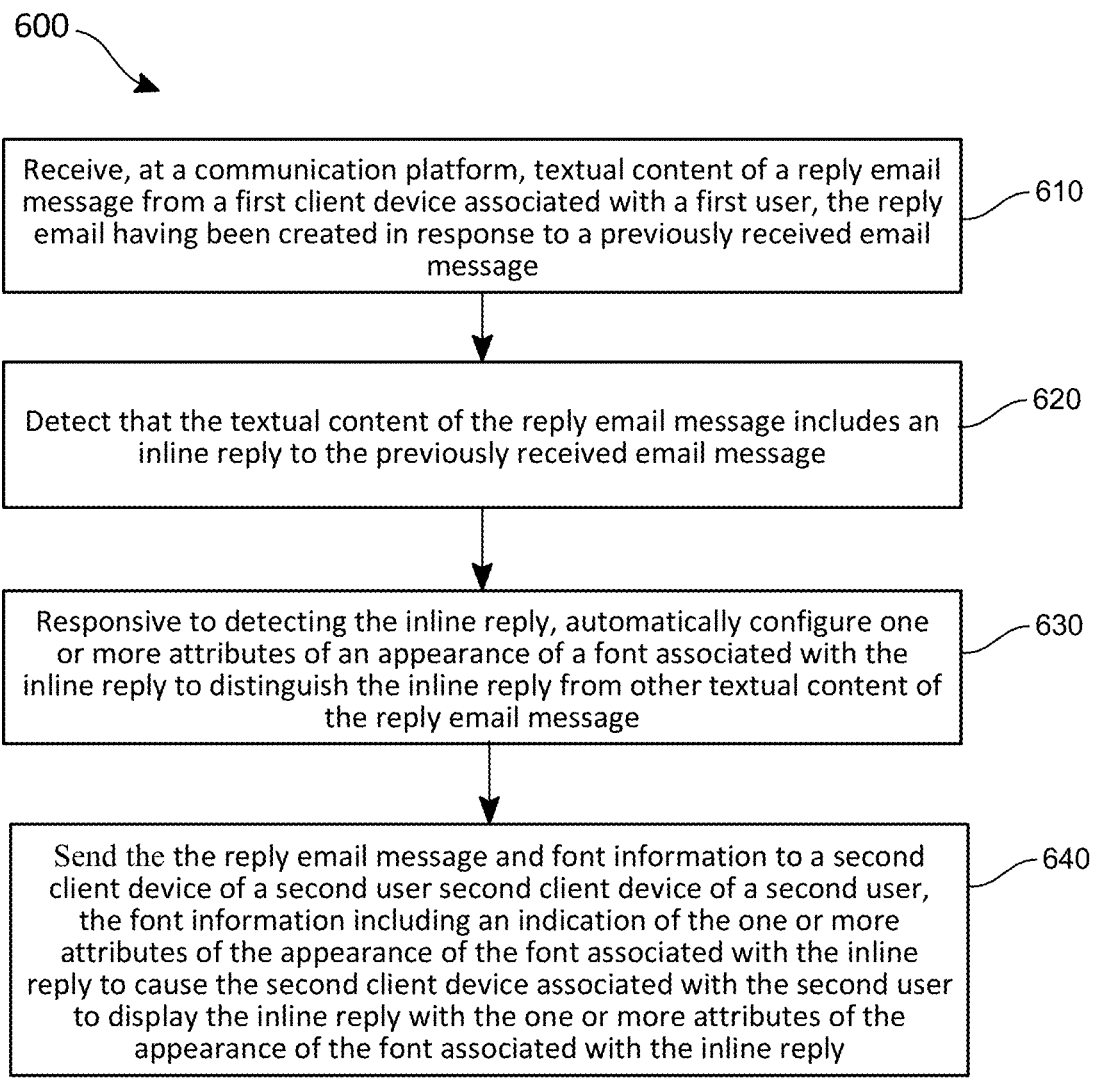
FIG. 6 is an example flow chart of another example process for managing font attributes of inline replies in email messages according to the techniques provided herein.

FIG. 6 is an example flow chart of an example process 600 for managing font attributes of inline replies in email messages. The process 600 may be implemented by the communication platform 110 and/or the writing assistant service 125. In some implementations, the communication platform 110 implements the functionality of the writing assistant service 125. In the process 600, the determination that that a first user has added an inline comment is made on the server, and an indication of the font attributes to use for the inline reply are sent with the email message to the client device of a second user so that the client device of the second user displays the inline reply with the font attributes selected for the inline reply. As indicated in the preceding examples, the first user may select the font attributes or the communication platform may automatically select the font attributes for the first user.

The process 600 includes an operation 610 of receiving, at a communication platform, textual content of a reply email message from a first client device associated with a first user, the reply email having been created in response to a previously received email message. In some implementations, the client device 105 sends the textual content of the reply email message to the communication platform 110 for processing to detect inline replies and/or forwarding to the intended recipient or recipients of the reply email message.

The process 600 includes an operation 620 of detecting that the textual content of the reply email message includes an inline reply to the previously received email message. In some implementations, the communication platform 110 determines that an inline reply has been added to the modified email text by detecting that the textual content includes a key word or key phrase indicative of an inline reply being added to the textual content of the email message. In some implementations, the communication platform 110 determines that an inline reply has been added to the modified email text by detecting that additional textual content has been added within the textual content of the email message as received by the first user.

The process 600 includes an operation 630 of responsive to detecting the inline reply, automatically configuring one or more attributes of a font associated with the inline reply to distinguish the inline reply from other textual content of the reply email message. In some implementations, the communication platform 110 suggests font attributes that are different than the font used for the remainder to the email message to help recipients of the email message to distinguish the inline reply from the rest of the text of the email message, including other inline replies. In some implementations, the communication platform 110 accesses user preferences for the first user to determine and apply font attributes preferred by the user.

The process 600 includes an operation 640 of responsive to detecting the inline reply, automatically configuring one or more attributes of a font associated with the inline reply to visually distinguish the inline reply from other textual content of the email message. The communications platform 110 automatically determines the attributes of the font for the inline reply in some implementations. As discussed in the preceding examples, the communications platform 110 selects these attributes based on user preferences in some implementations.

The process 600 includes an operation 650 of sending the reply email message and font information to a second client device of a second user second client device of a second user. The font information includes an indication of the one or more attributes of the font associated with the inline reply to cause the second client device associated with the second user to display the inline reply with the one or more attributes of the appearance of the font associated with the inline reply. This allows the recipients of a reply email that includes inline replies to more easily visually distinguish the inline replies from the text of the original email and/or from the inline replies of other users.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
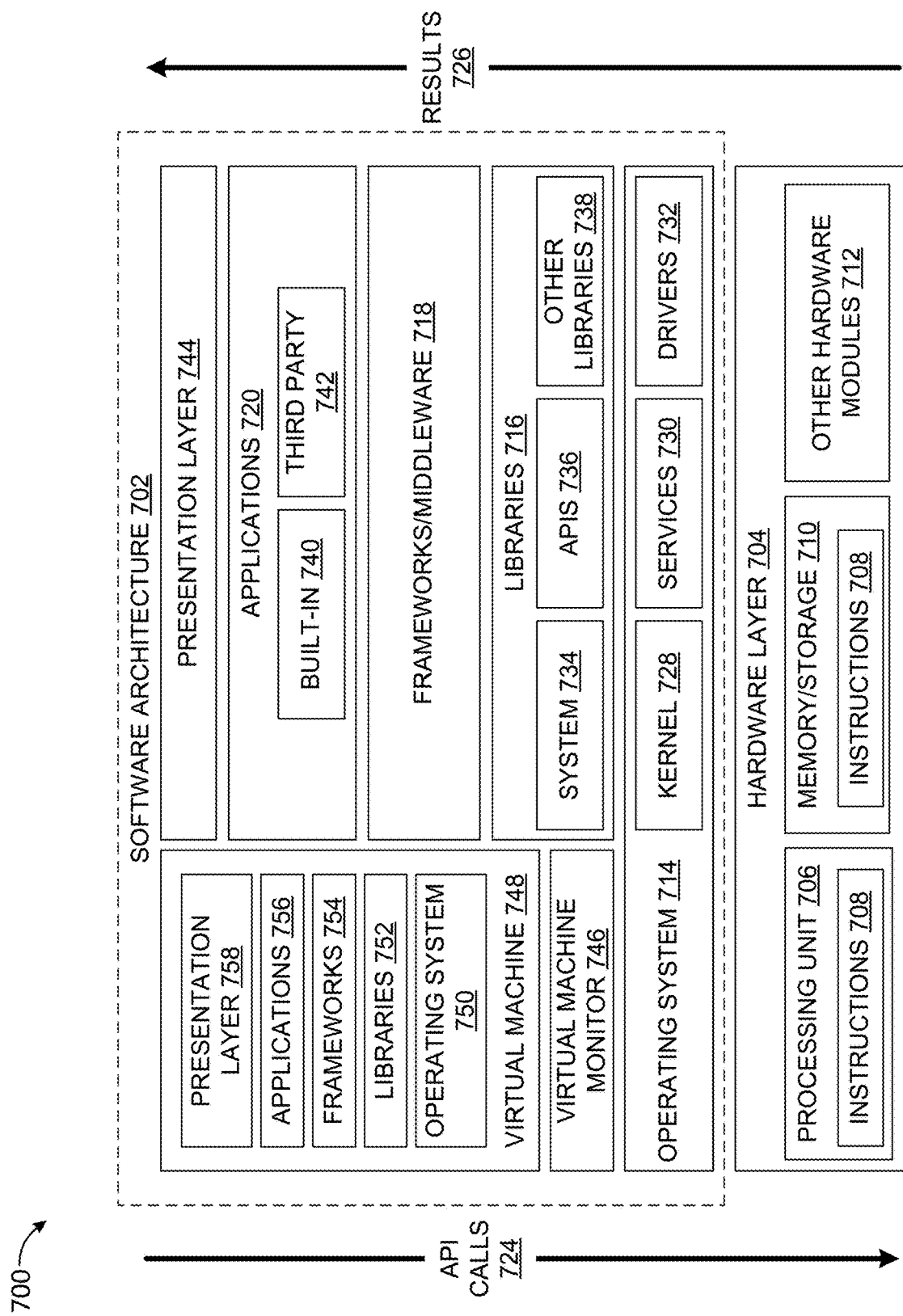
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
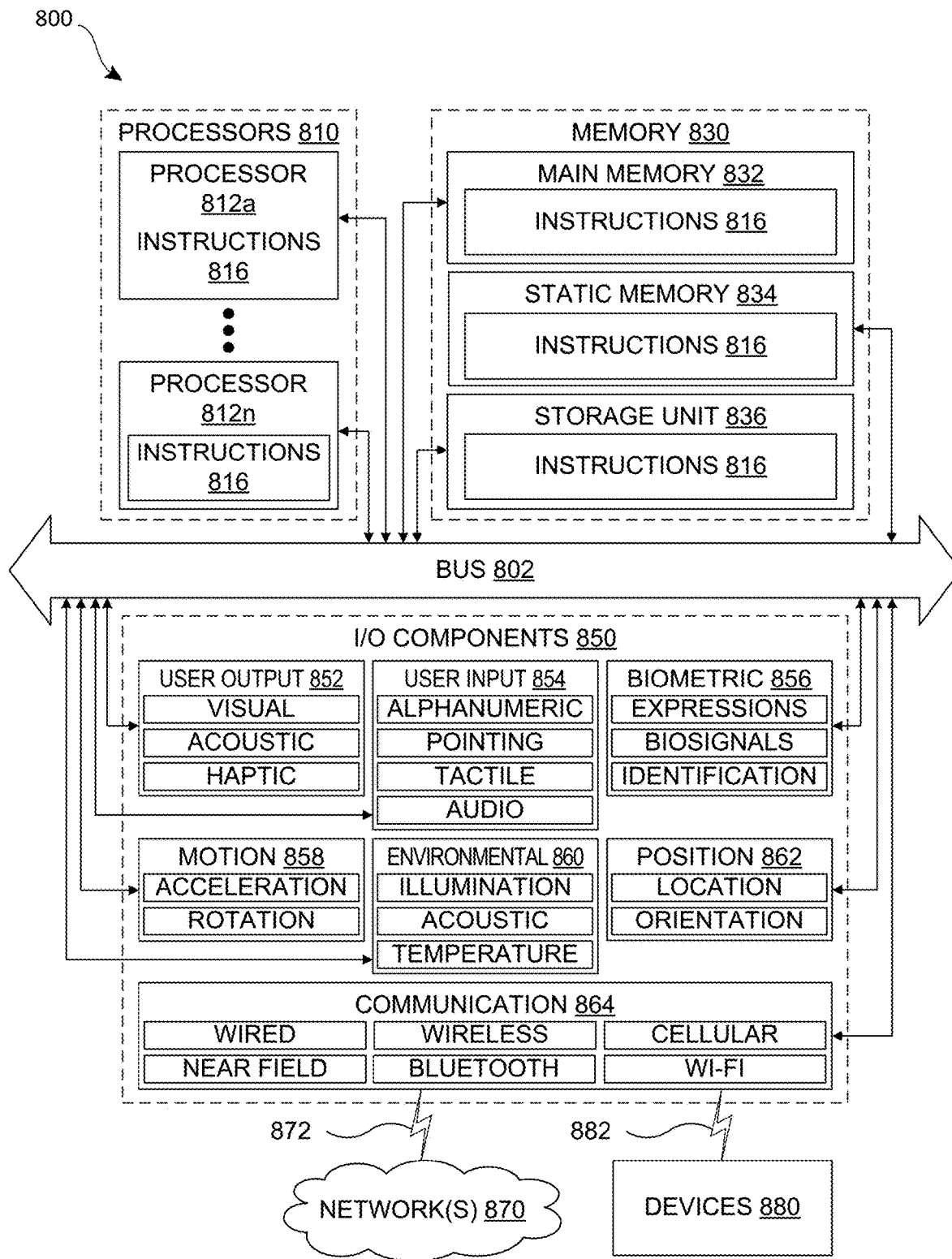
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow; are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations of:
detecting a word or phrase authored and manually entered by a first user in a reply email message while analyzing textual content of the reply email message as the reply email message is being authored by the first user in a first application accessible by a first client device, the reply email message being created in response to a previously received email message, wherein textual content of the previously received email message is automatically included as is at an end of the reply email message, the word or phrase is manually entered before the textual content of the previously received email message, a meaning of the word or phrase indicating an inline reply is to be added to a body of the textual content of the previously received email message, and the inline reply includes content authored and manually entered by the first user in response to the textual content of the previously received email message;
and
responsive to the detecting, causing the first application to perform operations of:
automatically configuring one or more attributes of a font of the inline reply to visually distinguish the inline reply from the textual content of the previously received email message, and
causing the first client device to display the inline reply with an appearance of the font of the inline reply determined based on the one or more attributes.

2. The data processing system of claim 1, wherein the machine-readable storage medium further includes instructions configured to cause the processor to perform an operation of displaying a tag identifying the first user of the inline reply, and wherein the tag is placed next to the inline reply.

3. The data processing system of claim 2, wherein the machine-readable storage medium further includes instructions configured to cause the processor to perform an operation of sending the reply email message with embedded font information to a second user, the embedded font information including the one or more attributes of the font of the inline reply to cause a second client device associated with the second user to display the inline reply with the one or more attributes of the font of the inline reply, to display another inline reply entered at the second client device with one or more font attributes different from the one or more attributes of the font of the inline reply, and to display another tag identifying the second user of the other inline reply, wherein the other tag is placed next to the other inline reply.

4. The data processing system of claim 2, wherein the machine-readable storage medium further includes instructions configured to cause the processor to perform an operation of highlighting the word or phrase to provide an indication that the word or phrase is associated with a control, which when activated, causes a font attribute configuration pane to be displayed, the font attribute configuration pane including controls for controlling attributes that alter the appearance of the font in which the inline reply is displayed, and
wherein the tag includes at least one of a name, an initial, or an email address of the first user.

5. The data processing system of claim 1, wherein the machine-readable storage medium further includes instructions configured to cause the processor to perform an operation of automatically configuring one or more attributes of the font of the inline reply identical to one or more attributes of a font of the word or phrase authored and manually entered by the first user.

6. The data processing system of claim 1, wherein the machine-readable storage medium further includes instructions configured to cause the processor to perform an operation of, responsive to automatically configuring the one or more attributes of the font of the inline reply, causing the first client device to display a font attribute configuration pane, the font attribute configuration pane including controls for controlling attributes that alter the appearance of the font in which the inline reply is displayed.

7. The data processing system of claim 1, wherein automatically configuring the one or more attributes of the font of the inline reply further comprises:
accessing user preference information associated with the first user, the user preference information indicating preferred font attributes for inline replies; and
automatically configuring the one or more attributes the font of the inline reply according to the user preference information.

8. The data processing system of claim 7, wherein the machine-readable storage medium further includes instructions configured to cause the processor to perform operations of:
receiving updated user preference information from the first user, the updated user preference information including updates to the one or more attributes of the font of the inline reply preferred by the first user for inline replies; and
sending the updated user preference information to a communications server from which the previously received email message was sent to the first client device of the first user to cause the communications server to update the updated user preference information associated with the first user with the updated user preference information.

9. The data processing system of claim 7, wherein the machine-readable storage medium further includes instructions configured to cause the processor to perform operations of:
determining that a second user has already utilized the preferred font attributes for inline comments provided by the second user;
determining alternate font attributes to distinguish the inline reply of the first user that are different than the preferred font attributes of the first user; and
causing a font attribute configuration pane to be displayed on the first client device, the font attribute configuration pane presenting the alternate font attributes on a user interface of the first client device of the first user, the font attribute configuration pane including controls for controlling attributes that alter the appearance of the font in which the inline reply is displayed.

10. A data processing system comprising:
a processor; and
a machine-readable storage medium storing executable instructions that, when executed, cause the processor to perform operations of:
detecting, at a communication platform, a word or phrase authored and manually entered by a first user in a reply email message while receiving textual content of the reply email message from a first client device associated with the first user, the reply email message having been created in response to a previously received email message, textual content of the previously received email message being automatically included as is at an end of the reply email message, the word or phrase is manually entered before the textual content of the previously received email message, a meaning of the word or phrase indicating an inline reply is to be added to a body of the textual content of the previously received email message, and the inline reply including content authored and manually entered by the first user in response to the textual content of the previously received email message;
and
responsive to the detecting, automatically configuring one or more attributes of a font of the inline reply to visually distinguish the inline reply from the textual content of the previously received email message; and
sending the reply email message with embedded font information to a second client device of a second user, the embedded font information including an indication of the one or more attributes of the font of the inline reply to cause the second client device associated with the second user to display the inline reply with the one or more attributes of the font of the inline reply.

11. The data processing system of claim 10, wherein the machine-readable storage medium further includes instructions configured to cause the processor to perform an operation of displaying a tag identifying the first user of the inline reply, and wherein the tag is placed next to the inline reply.

12. The data processing system of claim 10, wherein the detecting further comprises detecting that the inline reply has been authored and manually entered within the body of the previously received email message.

13. The data processing system of claim 10, wherein automatically configuring the one or more attributes of the font of the inline reply further comprises:
accessing user preference information associated with the first user, the user preference information indicating preferred font attributes for inline replies; and
automatically configuring the one or more attributes of the font of the inline reply according to the user preference information.

14. A method implemented in a data processing system for managing font attributes of inline replies in email messages, the method comprising:

detecting a word or phrase authored and manually entered by a first user in a reply email message while analyzing textual content of the reply email message as the reply email message is being authored by the first user in a first application accessible by a first client device, the reply email message being created in response to a previously received email message, wherein textual content of the previously received email message is automatically included as is at an end of the reply email message, the word or phrase is manually entered before the textual content of the previously received email message, a meaning of the word or phrase indicating an inline reply is to be added to a body of the textual content of the previously received email message, and the inline reply includes content authored and manually entered by the first user in response to the textual content of the previously received email message; and responsive to the detecting, causing the first application to perform operations of:

automatically configuring one or more attributes of a font of the inline reply to visually distinguish the inline reply from the textual content of the previously received email message, and causing the first client device to display the inline reply with an appearance of the font of the inline reply determined based on the one or more attributes.

15. The method of claim 14, further comprising:
displaying a tag identifying the first user of the inline reply, wherein the tag is placed next to the inline reply.

16. The method of claim 15, further comprising sending the reply email message with embedded font information to a second user, the embedded font information including the one or more attributes of the font associated with the inline reply to cause a second client device associated with the second user to display the inline reply with the one or more attributes of the font of the inline reply, to display another inline reply entered at the second client device with one or more font attributes different from the one or more attributes of the font of the inline reply, and to display another tag identifying the second user of the other inline reply, wherein the other tag is placed next to the other inline reply.

17. The method of claim 15, further comprising highlighting the word or phrase to provide an indication that the word or phrase is associated with a control, which when activated, causes a font attribute configuration pane to be displayed, the font attribute configuration pane including controls for controlling attributes that alter an appearance of the font in which the inline reply is displayed, and wherein the tag includes at least one of a name, an initial, or an email address of the first user.

18. The data processing system of claim 14, further comprising automatically configuring one or more attributes of the font of the inline reply identical to one or more attributes of a font of the word or phrase authored and manually entered by the first user.

19. The method of claim 14, further comprising responsive to automatically configuring the one or more attributes of the font of the inline reply, causing the first client device to display a font attribute configuration pane, the font attribute configuration pane including controls for controlling attributes that alter an appearance of the font in which the inline reply is displayed.

20. The method of claim 14, wherein automatically configuring the one or more attributes of an appearance of the font of the inline reply further comprises:

accessing user preference information associated with the first user, the user preference information indicating preferred font attributes for inline replies; and automatically configuring the one or more attributes of the appearance of the font of the inline reply according to the user preference information.

* * * * *